May 21, 1935.  A. H. AVERY  2,002,334
CALIPERING DEVICE
Filed Jan. 11, 1934
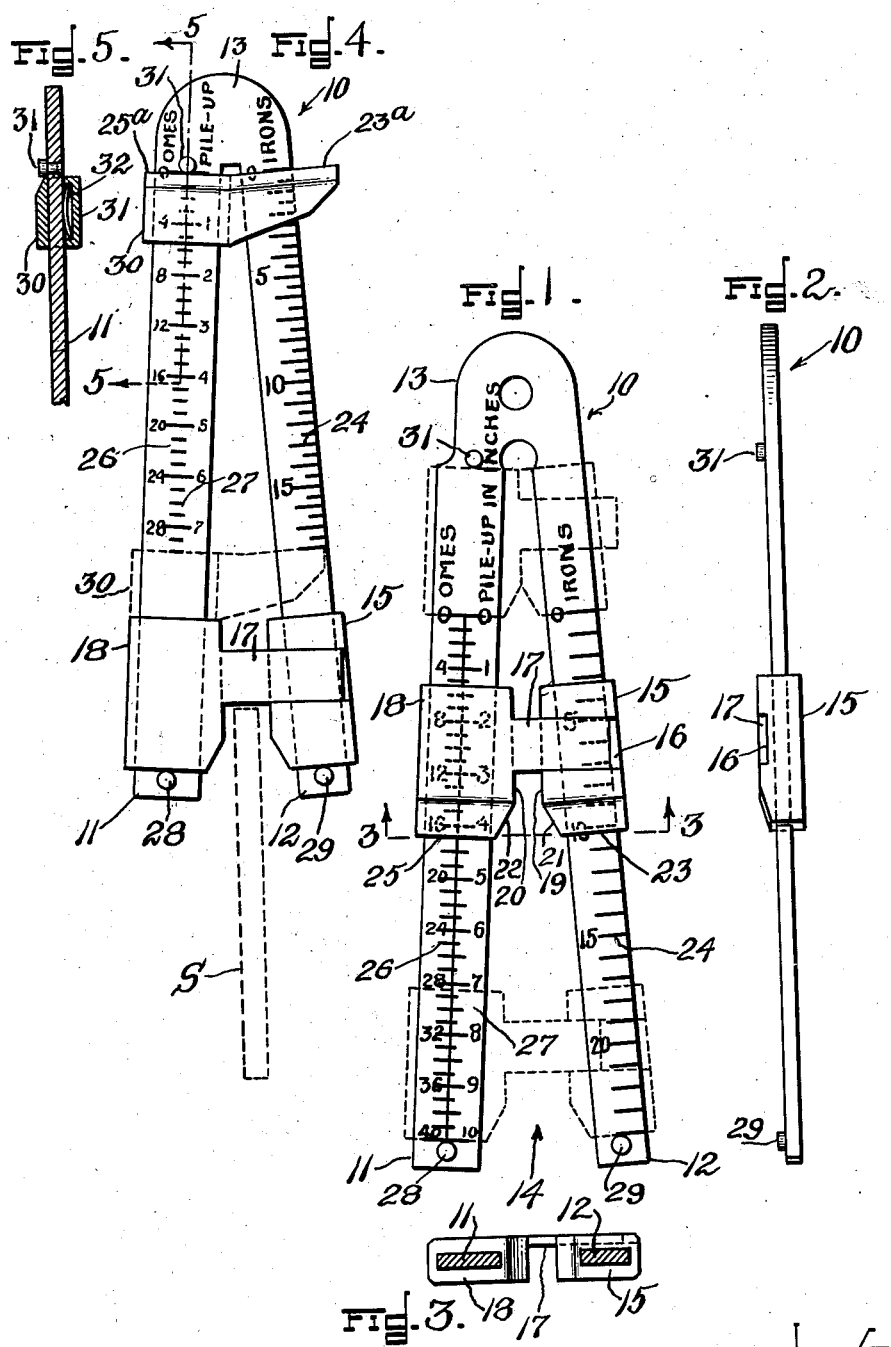
Inventor
Alfred H. Avery Patented May 21, 1935

2,002,334

UNITED STATES PATENT OFFICE 2,002,334

CALIPERING DEVICE

Alfred H. Avery, Malden, Mass., assignor to North American Holding Corporation, Syracuse, N. Y., a corporation of New York Application January 11, 1934, Serial No. 706,182

4 Claims. (Cl. 33—143)

This invention relates to a hand-operated calipering device for use in measuring the thickness grades of soles, taps, heel lifts and other pieces or blanks of leather used in the shoe and leather industries. Blanks of the kind mentioned are usually classified and graded in accordance with the thickness of the thinnest part of the blank or the thinnest part of a selected area of the blank. The marginal area of a blank or a selected part of the marginal area, such as the marginal area of the forepart of a sole, is commonly regarded as the area which determines the classification of the blank. For measuring such blanks there has long been in use in shoe manufacturing and kindred industries a hand calipering instrument known as a grading iron. An iron consists of a V-shaped piece of metal on one or both legs of which is marked a graduated scale to indicate the thickness measurement of the edge of a blank inserted as far as it will go in the V-shaped opening between the legs. The unit of measurement almost universally used in measuring pieces of leather and other blanks used in the shoe and leather industry is called an iron, which is 1/48 of an inch. The graduated scale on the iron (the instrument) is therefore designated in terms of irons (the measurement) and fractions of irons.

In measuring a blank by means of the instrument called a grading iron the blank is inserted edgewise into the V-shaped opening between the two legs of the iron until the edge of the blank is arrested by engagement with the inner diverging edges of the two legs. The thickness measurement of the edge of the blank, which engages the two legs of the instrument, may then be ascertained in terms of irons by reading the scale adjacent the edge of the blank. Obviously one such measurement of a blank would not show whether the spot measured was the thinnest spot or not. It is therefore the practice to apply the calipering iron to the blank a number of times at different places around its edge and to read the thickness measurement of the blank each time, as indicated by the scale, taking pains to keep in mind the thinnest measurement indicated by the scale, which determines the grade of the blank.

In applying an iron to the edge of a blank care must be exercised to apply pressure between the iron and the blank as uniformly as possible at all times. If undue pressure is applied the edge of the blank will tend to compress and wedge in between the legs of the iron and indicate too thin a measurement. If too little pressure is applied the thickness measurement indicated on the scale will be too large. In any event, erroneous measurements are apt to occur due to the inevitable uncertainty of the manual manipulation by the operator. In addition to the uncertainty arising from the personal equation of the operator, a serious objection to the old-fashioned irons is that only the corners at the edge of the sole or other blank engage the diverging legs of the iron and the legs tend to crush the corners more than they would if they engaged a substantial marginal area and to admit the sole too far into the V-shaped slot between the legs, thus preventing a fair measurement of the marginal area of the blank. Furthermore, inaccuracies of measurement due to these causes are increased by differences in the hardness or softness of the blanks.

The object of the present invention is to avoid these objections and to provide an improved hand-operated calipering device which will more accurately and more conveniently measure and record the thinnest measurement of the blank.

In the accompanying drawing.

Fig. 1 is a face view of a calipering device embodying the invention;

Fig. 2 is an edge or side view of the device shown in Fig. 1;

Fig. 3 is a cross section on line 3—3 of Fig. 1;

Fig. 4 is a face view of the device including an indicator slide for recording the minimum measurement; and Fig. 5 is a sectional detail on line 5—5 of Fig. 4.

The device comprises a V-shaped body member 10 having two straight legs 11 and 12 disposed side by side and diverging at an acute angle so as to form a wedge-shaped or V-shaped slot 14 between them. The legs are connected by an integral member 13 which serves both as a rigid connector and a handle.

Mounted to slide freely on the body member is a detecting or measuring gauge comprising two jaw members connected so as to slide in unison lengthwise of the body member and to approach each other or separate as the gauge is slid inwardly toward the connected ends of the legs or outwardly towards the diverging ends. One of the jaw members, 15, is mounted to slide freely on leg 12 and is provided on its face with a transverse groove 16, within which freely slides a crossbar 17 forming a part of the second jaw member 18. The crossbar 17 extends laterally from jaw member 18, bridging the slot 14 between the legs in all positions of the gauge, and is preferably made integral with jaw member 18. The jaw member 18 slides freely on leg 11. The crossbar 17 is made with a straight lower edge which is perpendicular to a line bisecting the slot 14 and serves as an abutment for the edge of the sole or other blank indicated in dotted lines at S in Fig. 4.

At the outer side of the crossbar 17, toward the diverging ends of the legs, the jaw members 15 and 18 are made with flat work-engaging surfaces 19 and 20, which are parallel to each other and parallel to a line bisecting the V-shaped slot 14. These work-engaging surfaces 19 and 20 are of such dimensions as to engage the desired extent of the marginal areas of the blanks to be measured. Below the work-engaging surfaces 19 and 20 the inner sides or corners of the jaw members 15 and 18 are beveled as shown at 21 and 22 to facilitate the entrance of the margins of the blanks between the jaws.

The jaw 15 is made at its lower end with a straight edge 23 which cooperates with a scale 24 marked on the leg 12. As herein shown the scale 24 is in terms of irons and the position of the straight edge 23 on scale 24 indicates the width of the space between the gauge surfaces 19 and 20 of the jaw members as measured in irons at any position of the jaw members on legs 11 and 12.

The other jaw member 18 is also made with a straight edge 25 at its lower end to cooperate with two scales 26 and 27 on the leg 11. The scales on leg 11 may indicate any other unit of measurement desired. As herein shown the scale 26 is laid out according to a unit of measurement which I term an "ome", one ome being equal to 1/80 of an inch or .6 of an iron. The corresponding scale 27 is laid out to designate the thickness of the blanks according to their so-called "pile-up" characteristics in inches, an established system of measurement hereinafter more fully explained.

The graduations of each scale are so laid out with relation to the others that the indicator slide in any position will simultaneously indicate the corresponding measurement of the blank in terms of all of the units of measurement.

In using the instrument it is held up in a pendant position by one hand of the user while he employs the other hand to insert a sole or blank edgewise into the V-shaped slot 14 in the position shown in dotted lines at S in Fig. 4. When the instrument is held in this position the jaw members 15 and 18 of the gauge will slide by gravity to the lower ends of the legs 11 and 12 with the jaw member 18 abutting against a stop 28 on leg 11 and the jaw member 15 abutting against a stop 29 on leg 12. When the edge of the blank is brought to bear against the lower or outer edge of the crossbar 17 with a margin of the blank between the gauge surfaces 19 and 20, continued movement of the blank into the slot 14 will cause the two jaw members 18 and 15 to slide inwardly on the legs and consequently to approach each other until the gauge surfaces 19 and 20 of the jaw members bear against the opposite sides of the margin of the blank, whereupon the inward movement of the measuring gauge and the blank will be arrested. While the blank is thus clamped between the two jaw members the operator may read the thickness measurement of the area thus measured as indicated on one or any of the scales by the lower straight edges of the jaw members associated with said scales. When the blank is withdrawn from the instrument the jaw members 18 and 15 will again move by gravity to their extreme open position against stops 28 and 29.

Additional measurements of other marginal areas of the blank at as many points as desired around its periphery may then be made and read in the same manner and the grade of the blank is determined by the thinnest measurement thus ascertained.

It will be understood that the scales might be so arranged with relation to the slides 18 and 15 that the readings would be taken from their inner or upper edges instead of from their lower edges 25 and 23.

In order to save the operator from the necessity of remembering the thinnest measurement of a number of measurements made on the same blank, and to avoid error in so doing, I have provided a recording indicator slide, in the embodiment of the invention illustrated in Figs. 4 and 5, to preserve and record the thinnest measurement ascertained.

The recording slide 30 embraces and slides on leg 11 and is of such length as to span both legs. It is provided with an interior pocket 31 within which is a small leaf spring 32 bearing against the back side of leg 11 to hold the slide 30 yieldingly and frictionally in any position to which it may be adjusted. The recording slide is also provided with a straight edge 25ª to cooperate with the scales 26 and 27 on leg 11 and a straight edge 23ª to cooperate with the scale 24 on leg 12.

Preparatory to measuring a blank by means of the instrument shown in Fig. 4 the jaws 18 and 15 are moved by gravity to the open or divergent ends of the legs against stops 28 and 29 and the recording slide 30 is manually slid toward the open ends of the legs as shown in dotted lines in Fig. 4. The manipulation of the blanks to be measured is then the same as has already been described. The sole or blank S is inserted between the ends of the legs against the crossbar 17 and the jaws 18 and 15 of the measuring gauge are pushed inward by the edge of the blank, moving the recording slide 30 with them until the movement is arrested by the clamping of the jaws 18 and 15 against the margin of the blank. Similar applications of the measuring gauge to a number of different areas on the margin of the blank are then made, and whenever a thinner area is encountered the recording slide will be moved a corresponding distance inward toward the connected ends of the legs. At the end of a series of such operations the recording slide will indicate on the scales the grade or measurement of the thinnest marginal spot ascertained by the measuring gauge.

A stop stud 31 provided at the top of leg 11 limits the movement of the recording slide in that direction. A similar stop stud 31 on the form of device shown in Fig. 1 limits the movement of the measuring gauge when no recording slide is used. In either case the limit of inward movement of the slide which indicates the measurement on the scales brings the slide to the position indicating zero.

It will thus be clear that by means of the above described instrument a blank may be easily and quickly measured through the whole or any desired part of its circuit, and that the measurements ascertained will be accurate owing to the engagement of the jaw members 15 and 18 with a substantial marginal area of the blank instead of merely the corners; also that the instrument will not only indicate the thickness grade of the blank in terms of irons, but will give the measurement in omes and indicate the "pile-up" characteristic of the blank.

Reference has been made a number of times to a unit of measurement termed an "ome" and to the so-called "pile-up" characteristics of soles or blanks of various thickness measurements. It is an established practice in the shoe and leather industry to designate the thickness grade of leather blanks, whether evened or unevened, and particularly the thickness grade of soles for women's shoes, by the so-called "pile-up" characteristic of the soles, by which is meant the height in inches of an arbitrary standard number of soles, usually 20 soles (10 pairs), of uniform thickness grade piled up or stacked one on top of another. For example, 2 inch "pile-up" soles means soles of such thickness that 20 of the soles will stack or pile up to a height of 2 inches. Since an iron is 1/48 of an inch, a 2 inch "pile-up" sole means a sole having a thickness grade of 4.8 irons. It is common practice for shoe manufacturers to order soles for women's shoes by designating the desired number of soles of the desired "pile-up" measurement, rather than by designating the desired number of soles of a stated grade measurement in terms of irons. Thus, an order for so many 2½ inch "pile-up" soles means soles of such thickness that 20 soles will pile up to a height of 2½ inches, in which case the thickness grade of each sole will be 6 irons; or, in order for 1½ inch "pile-up" soles means soles of such thickness that 20 soles will pile up to a height of 1½ inches, in which case the thickness grade of each sole will be 3.6 irons. The gradations of "pile-ups" customarily used by the trade differ from one another by intervals of ½ an inch, for example, a 2 inch "pile-up", a 2½ inch "pile-up", a 3 inch "pile-up", a 3½ inch "pile-up", and so on. Hence the difference in thickness between soles of one "pile-up" class and the next "pile-up" class, either thicker or thinner by ½ an inch, is 1.2 irons or 1/40 of an inch. Although the gradations of "pile-ups" commonly used in the trade differ by ½ an inch, it would be entirely practicable with the aid of the present invention to classify the blanks according to a closer measurement, and on scale 27, Fig. 1, I have shown the "pile-up" gradations in inches and quarter inches, making it possible to classify "pile-ups" differing from one another by ¼ of an inch. The difference in thickness between the blanks for each ¼ inch difference in their "pile-up" characteristics is .6 of an iron or 1/80 of an inch, and this unit I have adopted as a unit of measurement of the individual soles classified according to their "pile-up" characteristics, and have termed an "ome". Since one ome represents the difference in thickness between the blanks in each pile-up class and the next pile-up class having a pile-up measurement of ¼ of an inch greater or smaller, there is a difference of 4 omes in the measurement of the blanks for each one inch difference in their "pile-up" characteristics, or a difference of 2 omes between the blanks of the different "pile-up" classes as commercially recognized, which classes differ from one another by ½ an inch according to the prevailing custom of the trade.

To illustrate the application of these principles to the instrument shown in Fig. 1; assume that a blank is found to have a "pile-up" characteristic of 4¼ inches, as indicated by the straight edge 25 of slide 18 on scale 27. Then it is likewise indicated that the blank measures 17 omes on scale 26 or 10.2 irons on scale 24. Thus the pile-up characteristic and the corresponding thickness measurement in irons (or in omes) may be instantly and accurately determined at a glance, without computation or guess work, which has heretofore been necessary for translating a grade measurement from the terms of one system to those of the other system.

Although the graduations on scale 24 on leg 12 are shown in whole irons it will be understood that if desired the scale might be graduated in some other fraction of an iron; but that will not ordinarily be necessary since a sufficiently accurate estimate of fractions for practical purposes can be made by the eye.

It will often happen in measuring a blank that the straight edge 25 will register a measurement between two of the graduations on scales 26 and 27. In that case the "pile-up" characteristic will be read as the next thinner graduation (indicated above the straight edge 25 in Fig. 1) since it is customary to classify the "pile-up" characteristic of a sole which exceeds the measurement of one class but does not equal that of the next higher class, as belonging to the lower class. When such a sole is evened it may be evened to the thickness, as measured in omes, of the next thinner graduation on scale 26. Hence, when evened, the waste or loss of leather will at a maximum be less than one ome, that is, less than .6 of an iron or 1/80 of an inch.

Similarly, if the current usage is followed of classifying "pile-ups" by differences of ½ of an inch instead of ¼ of an inch, the classification of a blank which does not measure an even inch or half inch on the "pile-up" scale 27 is determined by the next lower inch or half inch mark. For example, when the straight edge 25 indicates 4¼ inches on scale 27, as shown in Fig. 1, the "pile-up" class to which the blank belongs is the 4 inch "pile-up".

I claim:

1. A calipering device for measuring the thickness grades of blanks used in the manufacture of shoes comprising a body member having two rigidly connected legs disposed side by side and extending divergently from their connected ends to receive between them a blank inserted edgewise, a measuring gauge including two jaw members, one mounted to slide on one of the legs and the other mounted to slide on the other leg, said jaw members being connected to slide in unison and having parallel blank engaging surfaces adapted to engage against opposite marginal surfaces of the blanks when the jaw members approach each other as they are slid inwardly on the body member toward the connected ends of the legs, and a transverse abutment on the gauge immediately adjacent the inner ends of the blank engaging surfaces of the jaw members to confine the measuring action of the blank engaging surfaces to the margin of the blank.

2. A calipering device for measuring the thickness grades of blanks used in the manufacture of shoes comprising a body member having two rigidly connected legs disposed side by side and extending divergently from their connected ends to receive between them a blank inserted edgewise, a measuring gauge including two jaw members, one mounted to slide on one of the legs and the other mounted to slide on the other leg, said jaw members having parallel blank engaging surfaces adapted to engage against opposite marginal surfaces of the blank when the jaw members approach each other as they are slid inwardly on the body member toward the connected ends of the legs, and a transverse abutment bar slidably connecting the two jaw members to guide the two jaw members toward and from each other as they are slid in unison lengthwise on the legs, one side of the abutment bar being immediately adjacent the inner ends of the blank engaging surfaces of the jaw members to confine the measuring action of the blank engaging surfaces to the margin of the blank.

3. A calipering device for measuring the thickness grades of blanks used in the manufacture of shoes comprising a body member having two rigidly connected legs disposed side by side and extending divergently from their connected ends to receive between them a blank inserted edgewise, a measuring gauge including two jaw members, one mounted to slide on one of the legs and the other mounted to slide on the other leg, said jaw members being connected to slide in unison and having parallel blank engaging surfaces adapted to engage against opposite marginal surfaces of the blanks when the jaw members approach each other as they are slid inwardly on the body member toward the connected ends of the legs, and a transverse abutment on the gauge immediately adjacent the inner ends of the blank engaging surfaces of the jaw members to confine the measuring action of the blank engaging surfaces to the margin of the blank, the outer ends of the blank engaging surfaces being beveled to form a flared opening to facilitate the entrance of the blank between the jaw members.

4. A calipering device for measuring the thickness grades of blanks used in the manufacture of shoes comprising a body member having two rigidly connected legs disposed side by side and extending divergently from their connected ends to receive between them a blank inserted edgewise, a measuring gauge including two jaw members, one mounted to slide on one of the legs and the other mounted to slide on the other leg, said jaw members having parallel blank engaging surfaces adapted to engage against opposite marginal surfaces of the blank when the jaw members approach each other as they are slid inwardly on the body member toward the connected ends of the legs, and a transverse abutment bar slidably connecting the two jaw members to guide the two jaw members toward and from each other as they are slid in unison lengthwise on the legs, one side of the abutment bar being immediately adjacent the inner ends of the blank engaging surfaces of the jaw members to confine the measuring action of the blank engaging surfaces to the margin of the blank, the outer ends of the blank engaging surfaces being beveled to form a flared opening to facilitate the entrance of the blank between the jaw members.

ALFRED H. AVERY.